P. & R. A. WILLIAMS.
Cotton-Presses.
No. 142,882.    Patented September 16, 1873.
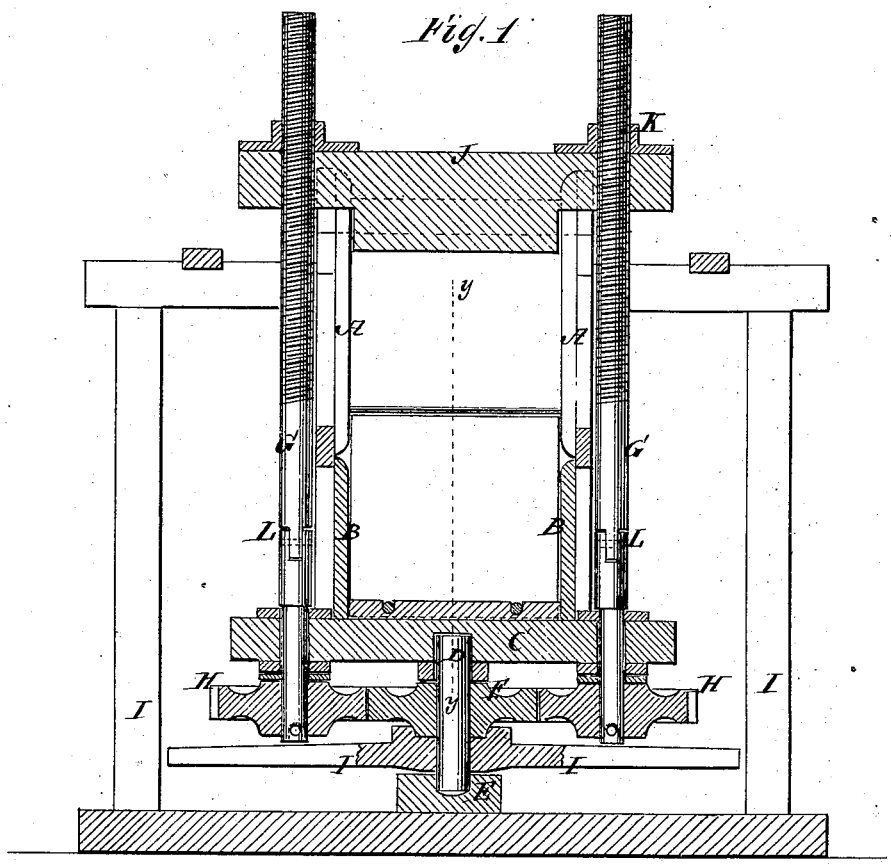
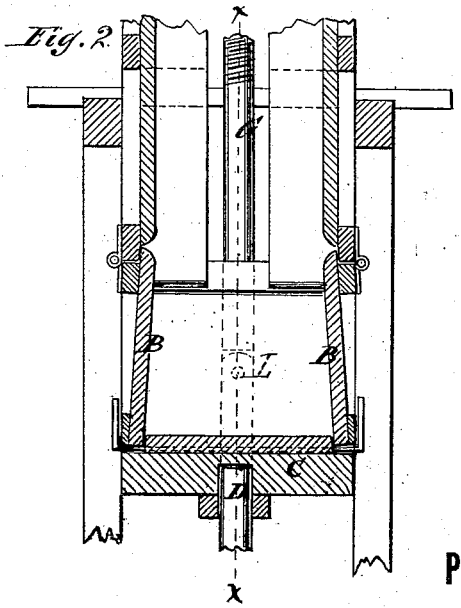
Witnesses:
E. Wolff
Sedgwick
Inventors:
P. Williams
R. A. Williams
Per
Attorneys.

UNITED STATES PATENT OFFICE.

PAUL WILLIAMS AND ROBERT A. WILLIAMS, OF WINONA, MISSISSIPPI.

IMPROVEMENT IN COTTON-PRESSES.

Specification forming part of Letters Patent No. 142,882, dated September 16, 1873; application filed June 21, 1873.

*To all whom it may concern:*

Be it known that we, PAUL WILLIAMS and ROBERT A. WILLIAMS, of Winona, in the county of Montgomery and State of Mississippi, have invented a new and Improved Cotton-Press, of which the following is a specification:

The invention consists of joints in the screws which work the follower, whereby the latter can be swung away from over the case, to allow of filling the case with the cotton or other material to be pressed.

Figure 1 is a sectional elevation of our improved press taken on the line $x\ x$ of Fig. 2, and Fig. 2 is a sectional elevation taken on the line $y\ y$ of Fig. 1.

Similar letters of reference indicate corresponding parts.

A is the upper portion and B the lower portion of the press-case, which is supported on the head C, which rests, at the center of the press-case, on the short shaft D, having its support in a step, E, in any suitable foundation. F is a driving-wheel on the shaft D, gearing with the screws G by the wheels H, and in this example having sweeps I attached for applying the power either by hand or animals. The frame is supposed to be large enough to allow the animals for applying the power to travel inside of it. A pulley or cog-wheel may be applied to the driving-wheel instead of the sweeps, if it be desired to apply the power in that way. The screws pass through and have a bearing in the press-head, and also pass through the follower J and the nuts K, bolted on the top, and screw the follower down and up. L represents the joints in the screws by which the follower is swung off from over the top of the case, to admit the substance to be pressed. Fig. 2 represents, at the part B, the increasing breadth of the said part of the case to allow the pressed material to expand a little, and thus relieve the sides from the pressure, so as to prevent bursting. This is more particularly needed for the two sides which constitute the doors for opening to remove the pressed ball, both because it is difficult to make the hinges and fastenings sufficiently strong without making them too large, and because the power required to release the fastening is lessened.

Having thus described our invention, we do not claim the combination of jointed screws with the follower of a press; but

We claim as new and desire to secure by Letters Patent—

The combination, with the box A of the press projecting above the frame, of the follower J, the screws G, the screw-threaded parts thereof being jointed (below the upper portion A of the press-box) to the plain-surfaced parts thereof, on which are keyed the gears H, as shown and described, for the purpose specified.

PAUL WILLIAMS.
ROBERT A. WILLIAMS.

Witnesses:
H. C. DIGGS,
J. P. HUGHES.